United States Patent [19]

Drolet et al.

[11] Patent Number: 4,468,473

[45] Date of Patent: Aug. 28, 1984

[54] PROTOENSTATITE CERAMIC UNITS AND PROCESS FOR THEIR PREPARATION

[75] Inventors: Jean P. Drolet; Jean P. Chevalier, both of Sherbrooke, Canada

[73] Assignee: Societe Nationale de Liamiante, Quebec, Canada

[21] Appl. No.: 412,208

[22] Filed: Aug. 27, 1982

[51] Int. Cl.³ ............................................. C04B 35/00
[52] U.S. Cl. ...................................... 501/155; 264/63
[58] Field of Search .................. 264/63; 501/155, 154

[56] References Cited

FOREIGN PATENT DOCUMENTS

| | | | |
|---|---|---|---|
| 2121401 | 8/1972 | France | 501/155 |
| 2398704 | 3/1979 | France | 501/155 |
| 771061 | 10/1980 | U.S.S.R. | 501/155 |
| 874711 | 10/1981 | U.S.S.R. | 501/155 |

*Primary Examiner*—James H. Derrington
*Attorney, Agent, or Firm*—Cushman, Darby & Cushman

[57] ABSTRACT

Protoenstatite ceramic units are prepared by compressing units of a mixture of 55 to 80 parts by weight of uncalcined demagnetized asbestos tailings with 22 to 44 parts by weight of a source of silica and from 0 to 17 parts by weight of fluxing agents and firing the units at 1250° to 1500° C.

8 Claims, No Drawings

PROTOENSTATITE CERAMIC UNITS AND PROCESS FOR THEIR PREPARATION

BACKGROUND OF THE INVENTION

Steatite bodies are used primarily as high frequency insulating bodies in the electronic and electronic and electrical appliance industries and are characterized by their high dielectric strength over wide temperature ranges, low power loss in the high frequency field, a water absorption of less than one percent and a high impact or mechanical resistance.

The common practice in the manufacture of steatite products consists in mixing silica-rich magnesium silicate rocks such as clinoenstatite crystals (talc) with small amounts of clay and a ceramic flux.

Typical steatite compositions presently available analyze as follows:

|     | $SiO_2$ % | MgO % | $Al_2O_3$ % | $K_2O$ % | $Fe_2O_3$ % | $TiO_2$ % | CaO % | $Na_2O$ % | BaO % |
| --- | --- | --- | --- | --- | --- | --- | --- | --- | --- |
| (a) | 64.74 | 28.24 | 4.45 | 1.03 | 0.83 | 0.03 | 0.25 | 0.43 | — |
| (b) | 61.7 | 29.23 | 2.55 | 0.05 | 1.22 | 0.03 | 0.05 | 0.11 | 5.16% |

It will be seen that contrary to (a), (b) contains alkaline earth oxide flux (BaO) which improves dielectric properties. It will also be seen that the iron oxide content ($Fe_2O_3$) is relatively low in these compositions.

It is also known that serpentine, particularly chrysotile asbestos contains the two most important constituents of steatite, namely, magnesium oxide and silica: Appreciating the enormous amount of chrysotile asbestos tailings and residues present near every asbestos mine in the world appear highly desirable if a procedure could be found to use these tailings and residues in the manufacture of steatite compositions whereby a substantial reduction in cost would be achieved while at the same time creating a new use of these tailings and residues for which only limited use has been found. It will also be appreciated that asbestos fibers represent only about 5% by weight of the mined asbestos rock and thus the cost of the tailings and residues is already included in the selling price of all asbestos fibers.

SUMMARY OF THE INVENTION

In accordance with the present invention there is provided a process for preparing protoenstatite ceramics units which include steatite which comprises mixing uncalcined and demagnetized asbestos tailings with a source of silica and after compressing this mixture, the unit is sintered within a temperature range of from 1250° to 1500° C. The steatite ceramic units thus obtained possess many of the desirable physical characteristics of presently available steatites. More particularly the physical and electrical properties can vary extensively depending on the amounts and the particule size of the starting materials and the sintering temperature.

DETAILED DESCRIPTION OF THE INVENTION

Essentially, steatite falls in the protoenstatite domain and contains the following ingredients as its main constituents: 24-32% of MgO and 55-65% of $SiO_2$, the remainder comprising aluminum oxide and ceramic fluxing agents. Ferric oxide and small amounts of other oxides may be present as impurities in the raw materials used.

It is also known that magnesium oxide, silica and iron oxide constitute the essential ingredients of asbestos tailings, the respective amounts varying with the location of the mine. The following Table I illustrates the major elements in the asbestos tailings of three different mines:

TABLE I

| Mine | MgO % | $SiO_2$ % | $Fe_2O_3$ % | Others % | L.O.I.* % |
| --- | --- | --- | --- | --- | --- |
| A | 40.80 | 35.4 | 7.3 | 1.20 | 15.30 |
| B | 39.69 | 35.76 | 8.06 | 2.54 | 13.95 |
| C | 36.95 | 38.35 | 8.95 | 2.89 | 12.86 |

*loss on ignition

It appears from Table I that asbestos tailings would not be suitable for the manufacture of steatite because of their high iron oxide content.

In accordance with the present invention there is provided a shaped mixture suitable for sintering at a temperature of from 1250° to 1500° C. using demagnetized asbestos tailings as the essential ingredients or, as the source of magnesium oxide and as partial source of silica.

More specifically, the shaped mixture comprises from 55 to 80 parts by weight of uncalcined and demagnetized asbestos tailings with 22 to 44.0 parts by weight of a source of silica, and from 0 to 17 parts by weight of fluxing agent. The mixture of the present invention after sintering will provide a steatite body wherein the percentages of MgO, $SiO_2$ and $Al_2O_3$ fall within the limits prescribed for steatite compositions. It will be observed that the percentage $Fe_2O_3$ content of asbestos tailings has been reduced first by the magnetic separation step and secondly by the addition of the source of silica, the latter contributing also to the reduction of the MgO and the increase of $SiO_2$ to within the prescribed limits for steatile compositions. The remainder of the composition will be made up of the impurities normally found in demagnetized asbestos tailings.

Furthermore, depending on the source of silica used, certain useful fluxing agents may be introduced into the mixture and these will contribute to beneficiating the steatite bodies prepared herein. On the other hand, if the source of silica is substantially pure, separate fluxing agents are to be added to obtain a better vitrification of the steatite.

ASBESTOS TAILINGS

As far as the asbestos tailings or residues which can be used in accordance with the present invention they are those normally found in most asbestos mines after removal of the asbestos fibers. In most cases the particle size is about −28 mesh (U.S. standard). The asbestos tailings are then demagnetized in accordance with procedures well known in the art and the non-magnetic fraction is recovered. Though the non-magnetic fraction can be used as such, a better product will be obtained if the −100 mesh fraction is recovered while grinding the −100 mesh fraction to −400 mesh will give superior results. The amount of uncalcined and demagnetized fraction is used in an amount of from about 55 to 80 parts by weight.

It will readily be appreciated by those skilled in the art that the content of asbestos tailings will vary with the mine where the tailings were obtained and it is on the MgO and $SiO_2$ content of the selected tailings that the amount of silica to be added will be calculated.

SOURCE OF SILICA

As a source of silica there can obviously be used pure silica. However, a more preferred choice would be to derive the desired silica from a natural aluminum silicate since this latter material will also be useful not only in providing at least part of the silica required to bring the level of original silica in the demagnetized asbestos tailings within the percentage range required in a steatite body but also contribute to provide the necessary fluxing agent. If the amount of silica in the aluminum silicate when added to the amount of silica in the demagnetized asbestos tailings is not sufficient to bring the total amount of silica to within the range of from 22 to 44.0% then pure silica is added so as to bring the total amount of silica to within the desired range.

As an example of natural aluminum silicates which can be used in accordance with the present invention there may be mentioned: Kaolinite ($Al_2O_3.2SiO_2.2H_2O$), halloysite ($Al_2O_3.2SiO_2.4H_2O$), pyrophillite ($Al_2O_3.4SiO_2.H_2O$), mica ($Al_2K(Si1.5AlO.5O5)_2 (OH)2$, potassium feldspath ($K_2O.Sl_2O_3.6SiO_2$), sodium feldspath ($Na_2O.Al_2O_3.6SiO_2$), nepheline syenite ($0.25K_2O..0.75Na_2O.1.11Al_2O_3.4.65SiO_2$), feldspath custer ($0.69K_2O\ o.31Na_2O.1.05Al_2O_3.7.05SiO_2$), sillimanite ($Al_2O_3.SiO_2$), spodumene ($Li_2O.Al_2O_3.4SiO_2$), petalite ($Li_2O.Al_2O.Al_2O_3.8SiO_2$).

When pure silica is used the amount will vary from 22 to 44.0 parts. On the other hand, when using an aluminum silicate, the amount to be added will be conditioned on the silica content of the selected aluminum silicate, keeping in mind that the aluminum oxide in the final mixture as well as other elements in the silicate, should not be above 17.0%. The difference between the amount of silica provided by the aluminum silicate and required in the final mixture will be made up by the addition of pure silica.

The important advantage of using natural aluminum silicates is that they constitute a source of plasticity required to from the units. A further advantage in using those natural aluminum silicates containing sodium oxide, potassium oxide or lithium oxide is that they provide a further source of fluxing agents to the mixture without the necessity of using an independent addition of said fluxing agents.

FLUXING AGENTS

Apart from the demagnetized asbestos tailings, pure silica and aluminum silicates, it may be desired to add to the starting mixture fluxing agents such as barium fluoride, barium oxide, calcium fluoride to make low loss steatite bodies. In a particular case where aluminum silicate is not used, the amount of fluxing agents could reach up to 17 parts by weight of the starting materials.

MIXING AND COMPRESSING

The ingredients making up the mixture are then blended with a wetting agent or a binder to form a moist mixture. The amount of aqueous binder depends on the manufacturing process used to form the desired unit. Usually the aqueous binder will be added in an amount of from 5 to 18 parts. Aqueous binders are well known in the ceramic art and their purpose is to agglomerate the ingredients so that the mix can be readily handled for compression or extrusion int units. As an example of a suitable binder, there may be mentioned cutting oil, water, and hydrated magnesium chloride in equal parts.

Compression of the wet mixture thus obtained is carried out at a pressure of from 4000 to 6000 psi with a molding pressure of 5000 psi being very satisfactory. The compressed units are more than sufficiently rigid to be handled without extra precautions. The units may be stored for sintering at a later time.

PARTICLE SIZE

The properties of the protoenstatite ceramic products obtained from the present invention can vary over a large scale depending upon the particle size of the starting materials. For example, the larger particles size e.g. 150 to 250 microns used will tend to give products having a fairly high water absorption accompanied with a low crushing strength. On the other hand these two features can be modified according to the type product desired by using starting materials of smaller particles size, such as those having 44 microns or less or −325 mesh U.S. Standard.

SINTERING TEMPERATURE

The green compressed moulded units of the present invention are sintered within a temperature range of from 1250° to 1500° C. for a period of from 2 to 4 hours.

STEATITE BODIES

The steatite bodies obtained in accordance with the present invention possess the desired physical and electrical properties of known steatite compositions. For example, they are useful as high frequency insulating materials high dimensional stability, good mechanical resistance, and low dielectric loss.

Chemically, the steatite bodies corresponding substantially to the composition of known steatite composition i.e. a MgO content of 25–32% and a $SiO_2$ content of from 55 to 65%. The balance of the composition will depend on whether the source of silica is pure silica or a mixture of aluminum silicates and silica. When pure silica is used the balance of the composition will comprise $Fe_2O_3$ and $Al_2O_3$ contained in the starting demagnetized asbestos tailings along with the other impurities inherent to said asbestos tailings. When the source of silica is a mixture of aluminum silicate and silica the balance of the composition will be the oxides such as $Fe_2O_3$ including those of other metals inherent in the starting demagnetized asbestos tailings along with those that might be present in the selected aluminum silicate.

MOLDED SHAPES

The products of the present invention are molded in the shape of tiles for various industrial uses. For example, ceramic tiles prepared according to the present invention can be used wherever an acid surface is required such as for example laboratory table tops where the water absorption must be less than 0.5% and floor tiles where the water absorption must be less than 3%.

EXAMPLE

The starting materials are mixed and 12 parts of a wetting agent is added to obtain a dry mixture. The dry mixture is then mixed with a binder and the wet mix is then compacted into units at a pressure of 5000 psi in the shape of cylinders having 1⅛" in diameter and 2" in length. The green units are then dried in an oven and sintered at the indicated temperatures in each example for a period of 2 hours in an oxidizing atmosphere.

Whenever a mesh size is used in this application it is measured according to the U.S. Standard.

EXAMPLE 1

(A) Formulation:
- 59.17% demagnetized asbestos tailings (−100 mesh), (Bell Mines)
- 27.83% silica (−200 mesh)
- 12.98% calcined alumina (−325 mesh)

(B) Compacting Pressure: (double action press): 5000 psi (C) Chemical Composition After Firing:

| $SiO_2$ | MgO | $Al_2O_3$ | $Fe_2O_3$ | others |
|---|---|---|---|---|
| 56.11% | 25.42% | 14.67% | 1.93% | 1.76% |

(D) Properties after two (2) hours sintering at temperatures indicated:

| PROPERTIES | SINTERING TEMPERATURE (°C.) | | |
|---|---|---|---|
| | 1280 | 1300 | 1325 |
| Apparent density (g/cc) | 2.8 | 2.27 | 2.52 |
| Bulk density (g/cc) | 2.15 | 2.18 | 2.01 |
| Apparent (open) porosity (%) | 23.5 | 4.0 | 20.4 |
| Water absorption (%) | 10.9 | 1.84 | 10.11 |
| Cold crushing strength (psi) | 19,865 | 20,200 | 14,550 |
| Color | | light grey | |
| Softening temperatures: 1325° C. | | | |
| Safe operating temperature: 1300° C. | | | |

EXAMPLE 2

(A) Formulation:
- 56.6% demagnetized asbestos tailing −100 mesh (Bell Mines)
- 30.96% Kaolin −325 mesh
- 12.42% silica −200 mesh (B) Compacting Pressure: 5000 psi (C) Chemical Composition After Firing:

| $SiO_2$ % | MgO % | $Al_2O_3$ % | $Fe_2O_3$ % | others % |
|---|---|---|---|---|
| 56.16% | 25.6% | 13.74% | 2.02% | 2.37% |

(D) Properties after two (2) hours sintering at temperatures indicated:

| PROPERTIES | SINTERING TEMPERATURE (°C.) | | | |
|---|---|---|---|---|
| | 1280 | 1300 | 1325 | 1350 |
| Apparent density (g/cc) | 2.74 | 2.78 | 2.75 | fusion |
| Bulk density (g/cc) | 2.10 | 2.15 | 2.13 | |
| Apparent (open) porosity (%) | 23.5 | 22.7 | 22.8 | |
| Water absorption (%) | 11.13 | 10.7 | 10.65 | |
| Cold crushing strength (psi) | 19910 | 17720 | 16170 | |
| Color | | grey to light brown | | |
| Softening temperatures: 1350° C. | | | | |
| Safe operating temperature: 1325° C. | | | | |

EXAMPLE 3

(A) Formulation:
- 61.82% demagnetized asbestos tailings −100 mesh, (Bell Mines)
- 13.57% silica −200 mesh
- 18.10% nepheline syenite −200 mesh 6.51% $BaCO_3$ (B) Compacting Pressure: 5000 psi (C) Chemical Composition After Firing:

| $SiO_2$ | MgO | $Al_2O_3$ | $Fe_2O_3$ | others |
|---|---|---|---|---|
| 55.3% | 27.3% | 5.3% | 2.07% | 9.72% |

(D) Properties after two (2) hours sintering at temperatures indicated:

| PROPERTIES | SINTERING TEMPERATURE (°C.) | | |
|---|---|---|---|
| | 1280 | 1300 | 1325 |
| Apparent density (g/cc) | 1.94 | 2.02 | fusion |
| Bulk density (g/cc) | 1.94 | 2.02 | |
| Apparent (open) porosity (%) | 0.46 | 0.47 | |
| Water absorption (%) | 0.23 | 0.23 | |
| Cold crushing strength (psi) | 23,180 | 23,040 | |
| Color | grey | grey | |
| Softening temperatures: 1325° C. | | | |
| Safe operating temperature: 1280–1300° C. | | | |

OBSERVATIONS:
This composition could be a good composition for steatite bodies. Cold crushing strength could be improved by decreasing particle size.

EXAMPLE 4

This sample is identical to Example 3 except that the mix has been ground to obtain a powder going through 400 mesh.

(A) Formulation:
- 61.82% Asbestos tailings: −28 mesh demagnetized (Bell Mines)
- 13.57% Silica −200 mesh
- 18.10% Nepheline Syenite −400 mesh
- 6.60% Barium carbonate All the ingredients were ball-milled in a porcelain jar with high alumina pebbles and water. The resulting ship was dried and the power obtained went through a 400 mesh.

(B) Compacting Pressure: 5000 psi (C) Chemical Composition After Firing:

| $SiO_2$ | MgO | $Al_2O_3$ | $Fe_2O_3$ | others |
|---|---|---|---|---|
| 55.3% | 27.3% | 5.3% | 2.07% | 9.72% |

(D) Properties After Two Hours Sintering At 1315° C.:

| | |
|---|---|
| Apparent density (g/cc) | 2.29 |
| Bulk density (g/cc) | 2.29 |
| Apparent porosity % | 0.02% |

| | |
|---|---|
| Water absorption % | 0.01% |
| Cold crushing strength (psi) | 28,505 |
| Color | Light beige |
| Softening temperature | −1340° C. |
| Safe operating temperature | −1300−1315° C. |

Compared to Example 3 the cold crushing strength has been increased by about 20%, while the water absorption has been reduced tenfold.

EXAMPLE 5

(A) Formulation:
  63.09% demagnetized asbestos tailings −100 mesh, (Carey Mines)
  5.25% Kaolin −325 mesh
  27.13% silica −200 mesh
  4.52% alumina −325 mesh
(B) Compacting Pressure: 5000 psi
(C) Chemical Composition After Firing:

| $SiO_2$ | MgO | $Al_2O_3$ | $Fe_2O_3$ | others |
|---|---|---|---|---|
| 58.76% | 30.69% | 7.6% | 1.96% | 0.89% |

(D) Properties after two (2) hours sintering at temperatures indicated:

| PROPERTIES | SINTERING TEMPERATURE (°C.) | | | |
|---|---|---|---|---|
| | 1385 | 1400 | 1425 | 1450 |
| Apparent density (g/cc) | 2.85 | 2.65 | 2.27 | 2.18 |
| Bulk density (g/cc) | 1.88 | 2.15 | 2.23 | 2.14 |
| Apparent (open) porosity (%) | 34.1 | 19.1 | 2.12 | 2.05 |
| Water absorption (%) | 18.0 | 8.8 | 0.9 | 0.9 |
| Cold crushing strength (psi) | 12,820 | 22,320 | 30,050 | 33,850 |
| Color | | | | light grey |

Softening temperatures: 1450° C.
Safe operating temperature: 1425−1450° C.
OBSERVATIONS:
This composition could be a good candidate for steatite bodies when sintered at 1425−1450° C. Cold crushing strength could by improved by decreasing particle size.

EXAMPLE 6

(A) Formulation:
  56.61% Asbestos tailings −100 mesh, demagnetized (Carey)
  22.4% feldspath custer −325 mesh
  9.85% silica −200 mesh
  5.4% betonite −325 mesh
  5.74% $BaCO_3$
(B) Compacting Pressure: 5000 psi
(C) Chemical Composition After Firing:

| $SiO_2$ % | MgO % | $Al_2O_3$ % | $Fe_2O_3$ % | others % |
|---|---|---|---|---|
| 55.92% | 28.25% | 5.68% | 1.94% | 8.21% |

(D) Properties after two (2) hours sintering at temperatures indicated:

| PROPERTIES | SINTERING TEMPERATURE (°C.) | | |
|---|---|---|---|
| | 1280 | 1300 | 1325 |
| Apparent density (g/cc) | 2.2 | 2.08 | 2.45 |
| Bulk density (g/cc) | 2.11 | 2.03 | 1.93 |
| Apparent (open) porosity (%) | 4.03 | 2.91 | 21.36 |
| Water absorption (%) | 1.90 | 1.40 | 11.0 |
| Cold crushing strength (psi) | 24440 | 15880 | 6680 |
| Color | light grey | light grey | light grey |

Softening temperatures: 1325° C.
Safe operating temperatures: 1280−1300° C.

EXAMPLE 7

(A) Formulation:
  72.6% Residus −400 mesh (Bell Mines)
  27.4% silica −400 mesh
(B) Compacting Pressure: 5000 psi
(C) Chemical Composition After Firing:

| $SiO_2$ | MgO | $Al_2O_3$ | $Fe_2O_3$ | others |
|---|---|---|---|---|
| 62.68% | 31.78% | 0.81% | 2.40% | 2.11% |

(D) Properties After 4 Hours Sintering At 1325° C.:

| | |
|---|---|
| Apparent density (g/cc) | 2.63 |
| Bulk density (g/cc) | 2.61 |
| Apparent porosity (%) | 0.84 |
| Water absorption (%) | 0.32 |
| Cold crushing strength (psi) | 27,190 |
| Color | dark beige |
| Softening temperature | 1350° C. |
| Safe operating temperature | 1310−1330° C. |

We claim:
1. A process for the preparation of protoenstatite ceramic units which comprises:
   (a) mixing 55 to 80 parts by weight of uncalcined demagnetized asbestos tailings with 22 to 44.0 parts by weight of a source of silica selected from the group consisting of (a) natural aluminum silicate and (b) a substantially pure silica and mixtures of (a) and (b), and from 0 to 17 parts of fluxing agents;
   (b) compressing or extruding the said mixture into units;
   (c) firing said units at a temperature of from 1250° to 1500° C., and,
   (d) recovering protoenstatite ceramic units having as main constituents a MgO content of from 25 to 32% by weight and a $SiO_2$ content of from 55 to 65% by weight.
2. The process of claim 1, wherein the source of silica is substantially pure silica.
3. The process of claim 1, wherein the source of silica is made up of silica contained in a natural aluminum silicate and a substantially pure silica, the total amount of the thus supplied silica being from 22 to 44.0 parts by weight and the protoenstatite ceramic units thus obtained contain from 25 to 32% by weight of MgO, 55 to 65% by weight of $SiO_2$, the balance comprising the oxides of other metals present in the asbestos tailings and in the selected aluminum silicate.
4. The process of claim 1, 2, or 3, wherein the mixture of step (a) contains up to 17 parts by weight of at least one fluxing agent.

5. The process of claim 1 or 2, wherein the mixture of step (a) contains up to 17 parts by weight of substantially pure alumina.

6. The process of claim 1 wherein the source of silica is a natural aluminum silicate.

7. The process of claim 6 wherein the natural aluminum silicate is kaolinite, halloysite, pyrophillite, mica, potassium feldspath, sodium feldspath, nepheline syenite, feldspath custer, sillimamite, spodumine, or petalite.

8. The process of claim 1 wherein the natural aluminum silicate is kaolinite, halloysite, pyrophillite, mica, potassium feldspath, sodium feldspath, nepheline syenite, feldspath custer, sillimamite, spodumine, or petalite.

* * * * *